April 14, 1970   J. C. PRETI   3,506,968
FREQUENCY MEMORY FOR AN OSCILLATOR TO ACT DURING
INTERRUPTIONS IN CONTROL PULSES
Filed March 2, 1967

United States Patent Office
3,506,968
Patented Apr. 14, 1970

3,506,968
FREQUENCY MEMORY FOR AN OSCILLATOR TO ACT DURING INTERRUPTIONS IN CONTROL PULSES
Jean Claude Preti, Clamart, France, assignor to Societe de Fabrication d'Instruments de Mesure (S.F.I.M.), Massy, Essonne, France
Filed Mar. 2, 1967, Ser. No. 620,083
Claims priority, application France, Sept. 21, 1966, 77,097
Int. Cl. H03b 3/04; H02m 5/06
U.S. Cl. 340—173                                                     5 Claims

ABSTRACT OF THE DISCLOSURE

A frequency memory acting on an oscillator to control the latter in the event of momentary or prolonged failure of pilot impulses. The device comprises an oscillator having two inputs, one of which receives pilot pulses when they are present. The other input receives a voltage determining the oscillation frequency of said oscillator, said voltage being picked up at terminals of a capacitor via a high impedance output of a circuit being itself fed by pilot pulses when they are present so that, when said pulses stop, said oscillator is caused to function at the frequency of the last-received pilot pulses during a time which can be substantial. The voltage is maintained without appreciable loss at the terminal of said capacitor.

---

The present invention has as an object the provision of an electronic apparatus forming a frequency memory.

In certain electronic devices, periodic information can be affected by certain fluctuations. Thus, already known are Doppler radars which deliver signals the frequencies of which are proportional to the speeds of moving targets which receive the beam of electromagnetic waves and reflect the latter in the form of echoes.

It is known that, these echoes form signals which exhibit discontinuities due to fluctuations most often external to the apparatus. Such faults produce errors in velocity and acceleration measurements.

It is an object of the present invention to overcome these disadvantages by preserving a continuous frequency, i.e. a frequency exempt from such breaks therein, in signals of this kind. The invention accordingly provides apparatus for exploiting such signals of periodic form, which signals are first fed into a shaping circuit which is electrically connected to an oscillator synchronized by the shaped signals and to a frequency-voltage translator which is itself connected to said oscillator, whereby the output voltage from said translator, stored in a capacitor, drives the oscillator and causes it to deliver a frequency identical to the frequency which it generates when it is synchronized by said shaped signals, when the same are present.

This oscillator thus has two operating modes: first, when a synchronizing signal is present, it faithfully follows the frequency thereof; and second, when the synchronizing signal ceases, the oscillator oscillates on a frequency determined by a driving voltage issuing from the translator, with continuous oscillation being then insured by the voltage stored in the capacitor.

In the particular case of a Doppler radar, should the Doppler signal vanish, such a circuit will then behave as a frequency memory until renewal of the synchronizing signals.

The description which follows with reference to the accompanying non-limitative exemplary drawing will give a clear understanding of how the invention can be carried into practice.

In the drawing:

FIGURE 1 is a block diagram of a memory circuit according to the invention; and

FIGURE 2 shows in greater detail the circuit diagram of the apparatus according to the invention, in a form of embodiment thereof making use principally of transistors and other semiconductors.

Referring first to FIGURE 1, an apparatus according to the invention includes a unit 1 having an input 2 through which it receives a periodic signal which is shaped by unit 1. The output 3 from unit 1 divides into two branches, one branch 4 of which leads to an oscillator 5 the output 6 from which is applied to the load. The other branch 7 of output 3 from signal shaping unit 1 leads to a frequency-voltage translator 8 the output 9 of which is connected to a second input of final oscillator 5, and this output 9 is further connected through a line 10 to one plate of a capacitor 11.

As is more clearly shown in FIGURE 2, input 2 leads to the base of a transistor T1 connected to a transistor T2, and the circuitry associated to these two first transistors forms a flip-flop for shaping the signals injected through input 1.

Transistor T2 is connected through a capacitors-diode junction to the base of a transistor T3 which is in turn connected to a second transistor T4, and the circuitry associated with these two transistors T3 and T4 forms a monostable flip-flop acting as a frequency-voltage translator.

The collector output of transistor T4 is connected through a potentiometer-type junction to one of the plates of capacitor 11 and also to the base of a transistor T5.

The emitter of transistor T5 is connected to the base of a transistor T6 the collector of which is connected to the base of a transistor T7 which is the main oscillator, consisting of a single-junction transistor. The free-oscillating frequency of this transistor is determined by a capacitor 12 connected to the base of transistor T7 and to the collector of transistor T6. This free oscillation frequency is also determined by the equivalent resistance of transistor T6.

The collector of transistor T2 is connected via a conductor 4 to the base of a transistor T8 connected in series to transistor T7 which acts as the main oscillator in the sense that the collector of transistor T8 is connected to an electrode of transistor T7 other than its base.

Said electrode is additionally connected to the base of an amplifier transistor T9 the collector of which is connected via a conductor 6 to the input of a signal widening monostable flip-flop consisting mainly of two transistors T10 and T11, the output of which flip-flop is brought to low impedance by circuitry comprising a transistor T12 the emitter of which is connected to the load output 6a.

It should be noted that the circuitry hereinbefore described could be broken off ahead of transistor T9 and exclude transistor T9 as well as the chain of transistors T10, T11 and T12.

The principle of operation of the apparatus described above is a follows:

When the incoming signals on input 2 exhibit certain discontinuities, the latter have repercussion on shaping unit 1, so that oscillator 5 is no longer driven in synchronism with the periodical signal since the latter ceases. On the other hand, when signals free from discontinuities are being received, the frequency-voltage translator 8 delivers on its output 9 a certain voltage which is stored in capacitor 11.

When oscillator 5 ceases to be driven by its input 4 it continues to receive from capacitor 11, through its second input, a driving voltage which sustains the oscillation of oscillator 5 at a corresponding frequency equal to that of the periodic signal just before disappearance thereof. Thus, during breaks in the periodic signals, there is maintained on output 6 a frequency equal to that which preceded the break, until oscillator 5 is driven once more by the input 4, possibly at a modified frequency.

The signal forming process in unit 1 is performed by the flip-flop consisting of the two transistors T1 and T2. The two transistors T3 and T4 form the frequency-to-voltage translating monostable flip-flop. Transistors T1 and T2 also control the transistor T8 in series with oscillator transistor T7; which is thus energized by any signal issuing from output 3. The single-junction transistor T7 has a free oscillation frequency determined by the value of the capacitance of capacitor 12 and the resistance equivalent to transistor T6. The frequency-voltage translator output voltage, notably at the transistor T4 output, appears at the terminals of capacitor 11 and embodies the corrections due to the presence of the potentiometer, and this voltage is transmitted to the base of the transistor T5 supplying transistor T6 and operating as an emitter-follower stage that matches the high output impedance of the two-transistors T3, T4 stage to the low input impedance of transistor T6.

The output signals from oscillator T7 regardless of whether the latter is synchronized, or driven by the voltage from capacitor 11 are amplified by transistor T9. These amplified signals are used to trigger the signal-widening monostable flip-flop T10, T11 (which is also optional), and the output from this flip-flop is brought to said low impedance by transistor T12 which is likewise wired as an emitter-follower (this stage also being optional).

It goes without saying that changes may be made to the forms of embodiment hereinbefore described without departing from the scope of the invention. In its broader aspects, this frequency storing circuit is not limited in its applications to Doppler radars, but includes all applications for which, notwithstanding breaks in transmission, it is required to exploit signals in which interruptions represent a disadvantage.

What is claimed is:
1. In a Doppler radar system, an electronic memory for storing the frequencies of periodic signals susceptible of being disturbed by interruptions therein, comprising, in combination, signal shaping means having an input for receiving said signals and an output for the corresponding shaped signals, a synchronized oscillator having a first input connected to said output, whereby said oscillator is synchronized by said shaped signals when the same occur; said oscillator further including a second input; a frequency-to-voltage translator means having an input electrically connected to said output and an output having a high impedance connected to said second input of said oscillator whereby to provide a voltage drive for said oscillator; a voltage accumulating capacitor electrically connected to said frequency-to-voltage translator means output; and means for preserving, during each of said interruptions, the voltage accumulated by said capacitor.

2. A memory as claimed in claim 1 wherein said signal shaping means comprises a bi-stable flip-flop.

3. A memory as claimed in claim 1 wherein said frequency-to-voltage translator means comprises a monostable flip-flop having a high impedance output, said capacitor including a potentiometric control.

4. A memory as claimed in claim 1 wherein said oscillator comprises a single-junction transistor, an amplifier, and an amplifying and impedance matching stage connecting the transistor to said frequency-to-voltage translator means and through said amplifier to said signal shaping means.

5. A memory as claimed in claim 1 comprising a preamplifier, a signal widening circuit, and impedance matching means electrically connected to said preamplifier and having an output for utilizing the signals therefrom, the oscillator being connected by said preamplifier to the signal widening circuit.

References Cited

UNITED STATES PATENTS

| | | | |
|---|---|---|---|
| 2,567,286 | 9/1951 | Hugenholtz | 331—14 X |
| 3,074,027 | 1/1963 | Rout | 331—10 X |
| 3,204,195 | 8/1965 | Maestre | 307—273 X |
| 3,271,700 | 9/1966 | Gutzwiller | 307—271 |

OTHER REFERENCES

Strauss, Wave Generation and Shaping, McGraw-Hill (1960), p. 253.

TERRELL W. FEARS, Primary Examiner

H. L. BERNSTEIN, Assistant Examiner

U.S. Cl. X.R.
320—1; 331—10, 14